(12) United States Patent
Gordon

(10) Patent No.: US 12,319,139 B2
(45) Date of Patent: Jun. 3, 2025

(54) TRI-DRIVE TRANSMISSION FOR REAR MID-ENGINE VEHICLE

(71) Applicant: Robby Gordon, Charlotte, NC (US)

(72) Inventor: Robby Gordon, Charlotte, NC (US)

(*) Notice: Subject to any disclaimer, the term of this patent is extended or adjusted under 35 U.S.C. 154(b) by 299 days.

(21) Appl. No.: 17/901,418

(22) Filed: Sep. 1, 2022

(65) Prior Publication Data
US 2023/0076992 A1 Mar. 9, 2023

Related U.S. Application Data

(60) Provisional application No. 63/240,793, filed on Sep. 3, 2021.

(51) Int. Cl.
| | |
|---|---|
| *F16H 48/08* | (2006.01) |
| *B60K 17/02* | (2006.01) |
| *B60K 17/04* | (2006.01) |
| *B60K 17/344* | (2006.01) |
| *B60K 23/08* | (2006.01) |
| *F16H 47/00* | (2006.01) |
| *B60G 3/14* | (2006.01) |

(52) U.S. Cl.
CPC ........... *B60K 17/344* (2013.01); *B60K 17/02* (2013.01); *B60K 17/043* (2013.01); *B60K 23/08* (2013.01);
(Continued)

(58) Field of Classification Search
CPC .... B60K 17/344; B60K 17/02; B60K 17/165; B60K 23/0808; B60K 23/08;
(Continued)

(56) References Cited

U.S. PATENT DOCUMENTS

| | | | | |
|---|---|---|---|---|
| 1,239,990 A | * | 9/1917 | Ware | F16H 48/08 |
| | | | | 180/245 |
| 11,376,946 B2 | * | 7/2022 | Mock | B60K 11/04 |
| | | (Continued) | | |

FOREIGN PATENT DOCUMENTS

| | | | | |
|---|---|---|---|---|
| KR | 1020220054477 A | * | 5/2022 | ............. F16D 25/12 |
| WO | WO-2013093978 A1 | * | 6/2013 | ........... B60K 17/346 |

OTHER PUBLICATIONS

Alfa Romeo 16C Bimotore: the Beastl, Dec. 11, 2021, Cockpit, published online at https://www.cockpitdz.com /en/post/alfa-romeo-16c-bimotore-the-beast.†
(Continued)

*Primary Examiner* — Stacey A Fluhart
(74) *Attorney, Agent, or Firm* — Barry Choobin; Patent 360

(57) ABSTRACT

An apparatus and methods are provided for a transmission for a rear mid-engine vehicle. The transmission comprises a power transfer portion for receiving torque from the engine and a gearbox for providing conversions of rotational speed and torque. First and second side output portions conduct torque from the gearbox to the rear wheels. A forward output portion conducts torque to front wheels of a four-wheel drive vehicle. An air clutch comprising each output portion controls the degree of torque transferred to each wheel. The output portions are each coupled to a rear wheel by a rear axle, bevel gears, and rear portal gears. The rear axles are aligned with, and positioned above, the trailing arms to protect the rear axles from damage due to rocks and debris. The length and alignment of the rear axles cause CV joints to articulate in the same direction as the trailing arms.

15 Claims, 3 Drawing Sheets

(52) U.S. Cl.
CPC ............... *F16H 47/00* (2013.01); *B60G 3/14* (2013.01); *B60G 2200/132* (2013.01); *B60K 2023/0858* (2013.01)

(58) Field of Classification Search
CPC ........ B60K 2005/006; E05Y 2400/456; G05D 2101/10; F16H 48/08
See application file for complete search history.

(56) References Cited

U.S. PATENT DOCUMENTS

| | | |
|---|---|---|
| 2006/0135307 A1† | 6/2006 | Lim et al. |
| 2009/0236197 A1* | 9/2009 | Mizon ................ B60K 17/3467 192/93 R |
| 2012/0217116 A1* | 8/2012 | Nishimoto ........... B60K 17/344 192/56.6 |

OTHER PUBLICATIONS

Bertrand, The Alfa Romeo 16c Bimotore: an Engineer's Dream, Mar. 24, 2020, Automobili Eleganza, published online at least as early as Jun. 15, 2021 at https://a-e.li/reports/alfa-romeo-16c-bimotore/.†

Thorat, Sachin, Rear Engine Rear Wheel Drive | Advantages and Disadvantages, LearnMech.com at least as early as Apr. 8, 2018 at https://learnmech.com/rear-wheel-drive-advantages-and-disadvantages/.†

\* cited by examiner
† cited by third party

TRI-DRIVE TRANSMISSION FOR REAR MID-ENGINE VEHICLE

PRIORITY

This application claims the benefit of and priority to U.S. Provisional Application, entitled "Tri-Drive Transmission For Rear Mid-Engine Vehicle," filed on Sep. 3, 2021 and having application Ser. No. 63/240,793, the entirety of said application being incorporated herein by reference.

FIELD

Embodiments of the present disclosure generally relate to vehicle suspension systems. More specifically, embodiments of the disclosure relate to an apparatus and methods for a tri-drive transmission for a rear mid-engine vehicle and configured for driving front wheels and two rear wheels individually.

BACKGROUND

Off-road vehicles enjoy an enthusiastic following because of their many uses and versatility. As a result, several types of motorsports involve racing of various types of off-road vehicles. For example, competitions exist that are dedicated to various types of terrain, such as rally, desert racing, and rock-crawling. Besides their use in various motorsports, off-road vehicles commonly are used for sight-seeing and traveling to areas that may not be accessed by way of standard, paved roads.

The use of higher clearance, higher traction vehicles enables off-road vehicles to access trails and roads having rough, low traction surfaces that may not be traversed using a standard, on-road vehicle. As such, off-road vehicles typically comprise larger wheels, wider tires, and suspension configurations that are specifically engineered for use in off-road applications. As a consequence of such suspension configurations, as well as the rough terrain typically traversed, driver and passenger safety is a crucial concern. For example, drivers and passengers typically must be wear safety restraints during off-road travel. A wide variety of different types of safety harnesses are available for use with off-road vehicles.

Unlike on-road vehicles, such as passenger cars, off-road vehicles typically are open, often lacking windows, doors, and body panels common to passenger cars. A chassis comprising a structural arrangement of welded tubes typically is configured to support components of the off-road vehicle. For example, a front portion of the chassis is configured to support a front suspension of the off-road vehicle and various components of the off-road vehicle, such as a steering gear, a front differential, and the like. A rear portion of the chassis is configured to support a rear suspension of the off-road vehicle, such as rear trailing arms, as well as support various drivetrain components, such as a transaxle, a rear differential, an engine, and the like. Further, a roll cage or canopy comprising a welded tube structure coupled to the chassis is configured to protect the driver and passengers in the event of a rollover situation.

Trailing arm suspensions are well known and commonly used in off-road vehicles such as four-wheeled buggies. A typical trailing arm suspension comprises a trailing arm having one end pivotally connected to a vehicle frame or chassis through a frame bracket and another end connected to the vehicle frame by a spring or strut. The trailing arm supports an axle to which the vehicle wheels are mounted. Road-induced reaction forces acting on the wheels are controlled by the pivoting of the trailing arm in response to these forces, with the forces being resisted by the spring.

Given that off-road vehicles routinely travel over very rough terrain, such as mountainous regions, and are prone to tipping over, there is a desire to improve the mechanical strength, safety, convenience, and comfort of off-road vehicles, while at the same improving the performance of such vehicles.

SUMMARY

An apparatus and methods are provided for a transmission for a rear mid-engine vehicle. The transmission comprises a power transfer portion for receiving torque from the engine and a gearbox for providing conversions of rotational speed and torque. First and second side output portions conduct torque from the gearbox to the rear wheels. A forward output portion conducts torque to front wheels of a four-wheel drive vehicle. An air clutch comprising each output portion controls the degree of torque transferred to each wheel. The air clutches may be controlled by an artificial intelligence in response to detected road and/or driving conditions. The first and second side output portions are each coupled to a rear wheel by a rear axle, bevel gears, and rear portal gears. The rear axles are aligned with, and positioned above, the trailing arms to protect the rear axles from damage due to rocks and debris. The length and alignment of the rear axles cause CV joints to articulate in the same direction as the trailing arms.

In an exemplary embodiment, an apparatus for transmitting torque received from a rear mounted engine of a vehicle comprises: a power transfer portion for receiving torque from the engine; a gearbox for providing conversions of rotational speed and torque; a first side output portion; and a second side output portion.

In another exemplary embodiment, the apparatus further comprises a forward output portion adapted to conduct torque to front wheels of a four-wheel drive vehicle. In another exemplary embodiment, the forward output portion includes an air clutch configured to facilitate controlling the degree of torque that is transferred to the front wheels.

In another exemplary embodiment, the gearbox is in mechanical communication with the power transfer portion. In another exemplary embodiment, the gearbox includes multiple gears and gear trains arranged to provide block conversions of rotational speed and torque received from the engine by way of the power transfer portion.

In another exemplary embodiment, a first side gear transfer case is disposed between the gearbox and the first side output portion; and wherein a second gear transfer case is disposed between the gearbox and the second side output portion. In another exemplary embodiment, the first side gear transfer case and the second side gear transfer case house components configured to respectively communicate torque to the first side output portion and the second side output portion. In another exemplary embodiment, the components are configured to cause the first side output portion and the second side output portion to rotate in directions that cause rear wheels of the vehicle to rotate in the same direction.

In another exemplary embodiment, the first side output portion includes a first air clutch, and the second side output portion includes a second air clutch. In another exemplary embodiment, the first air clutch and the second air clutch are interconnected with a third air clutch comprising a forward output portion that is adapted to conduct torque to front wheels of a four-wheel drive vehicle. In another exemplary embodiment, the first air clutch, the second air clutch, and the third air clutch are configured to facilitate controlling the degree of torque that is respectively output by way of the first side output portion, the second side output portion, and the forward output portion. In another exemplary embodiment, each of the first air clutch, the second air clutch, and the third air clutch includes a solenoid configured to release air upon activation.

In another exemplary embodiment, air released from and one or more of the first, second, and third air clutch is routed to any other of the one or more of the first, second, and third air clutches. In another exemplary embodiment, the first, second, and third air clutches are controlled by way of an artificial intelligence configured to operate the first, second, and third air clutches in response to detected road and/or driving conditions. In another exemplary embodiment, the artificial intelligence is electrically coupled with various sensors that supply the artificial intelligence with data about the operation of the vehicle. In another exemplary embodiment, the artificial intelligence is configured to operate the first, second, and third air clutches to accommodate road and/or driving conditions without any need for intervention by a driver of the vehicle.

In another exemplary embodiment, the first side output portion is operably coupled to a rear passenger-side wheel by way of a first rear axle, bevel gears, and rear portal gears; and wherein the second side output portion is operably coupled to a rear driver-side wheel by way of a second rear axle, bevel gears, and rear portal gears. In another exemplary embodiment, the first rear axle and the second rear axle are aligned with inboard portions of trailing arms comprising a rear suspension of the vehicle. In another exemplary embodiment, the first rear axle and the second rear axle are disposed above the trailing arms to protect the first rear axle and the second rear axle are protected from potential damage due to impacts by rocks and other debris. In another exemplary embodiment, the first rear axle and the second rear axle each has a length and an alignment with the trailing arms that causes CV joints to articulate in the same direction as the trailing arms.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
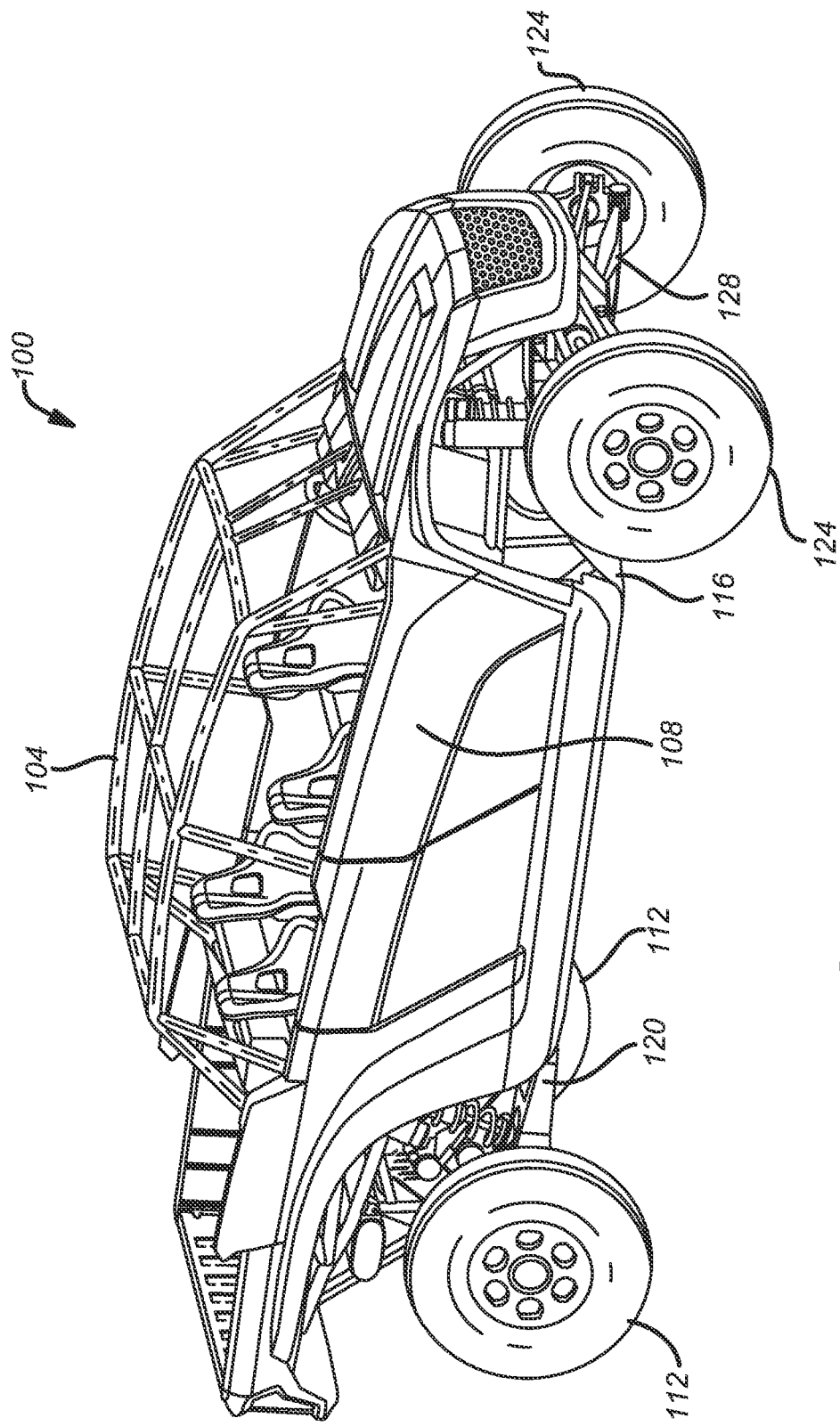
FIG. 1 illustrates an exemplary embodiment of an off-road vehicle that is configured to seat up to four occupants and is suitable for a rear mid-engine and a tri-drive transmission in accordance with the present disclosure.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the apparatus and methods disclosed herein may be practiced without these specific details. In other instances, specific numeric references such as "first gear," may be made. However, the specific numeric reference should not be interpreted as a literal sequential order but rather interpreted that the "first gear" is different than a "second gear." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Trailing arm suspensions are well known and commonly used in off-road vehicles such as four-wheeled buggies. A typical trailing arm suspension comprises a trailing arm having one end pivotally connected to a vehicle frame or chassis through a frame bracket and another end connected to the vehicle frame by a spring or strut. The trailing arm supports an axle to which the vehicle wheels are mounted. Road-induced reaction forces acting on the wheels are controlled by the pivoting of the trailing arm in response to these forces, with the forces being resisted by the spring. Given that off-road vehicles routinely travel over very rough terrain, such as mountainous regions, and are prone to tipping over, there is a desire to improve the mechanical strength, safety, convenience, and comfort of off-road vehicles, while at the same improving the performance of such vehicles. Embodiments disclosed herein provide an apparatus and methods for a tri-drive transmission for a rear mid-engine vehicle and configured for driving front wheels and two rear wheels individually.

FIG. 1 illustrates an exemplary embodiment of an off-road vehicle 100 that is particularly suitable for implementation of a tri-drive transmission in accordance with the present disclosure. As disclosed hereinabove, the off-road vehicle 100 generally is of a Utility Task Vehicle (UTV) variety that seats up to four occupants, includes a roll-over protection system 104, and may have a cab enclosure 108. As shown in FIG. 1, rear wheels 112 of the off-road vehicle 100 are operably coupled with a chassis 116 by way of rear suspension trailing arms 120. Front wheels 124 are operably coupled with the chassis 116 by way of a front suspension system 128. It should be understood, however, that the rear suspension trailing arms 120 disclosed herein are not to be limited to the specific off-road vehicle 100 shown in FIG. 1, but rather the rear suspension trailing arms 120 may be incorporated into a wide variety of vehicles, other than the off-road vehicle 100 of FIG. 1, without limitation.

As will be recognized by those skilled in the art, the rear wheel 112 generally is fastened to the rear suspension trailing arm 120 by way of a wheel hub (not shown). Preferably, the wheel hub is rotatably attached to the rear suspension trailing arm 120 by way of one or more suitably sized roller bearings. As will be further recognized, the rear wheel 112 and wheel hub generally are driven by way of a constant velocity (CV) joint configured to convey torque from an engine of the vehicle.

Moreover, although the rear suspension trailing arm 120 illustrated and described herein is best suited for use in a rear suspension of a vehicle, it is contemplated that the trailing arm 120 is not to be limited to rear suspensions, but rather in some embodiments, the trailing arm 120 may be configured for use in a front suspension of a vehicle, without limitation, and without deviating beyond the spirit and scope of the present disclosure. For the sake of brevity, however, the trailing arm 120 is hereinafter discussed in connection with a rear suspension of a vehicle. As such, terms conveying a relative positioning of components or portions comprising the trailing arm 120, such as "forward," "rearward," "back," "front," "proximal," and "distal," should not be construed as limiting in nature, but rather such terms should be understood merely as tools used to convey the details of the invention to those of ordinary skill in the art.

Figure 2:
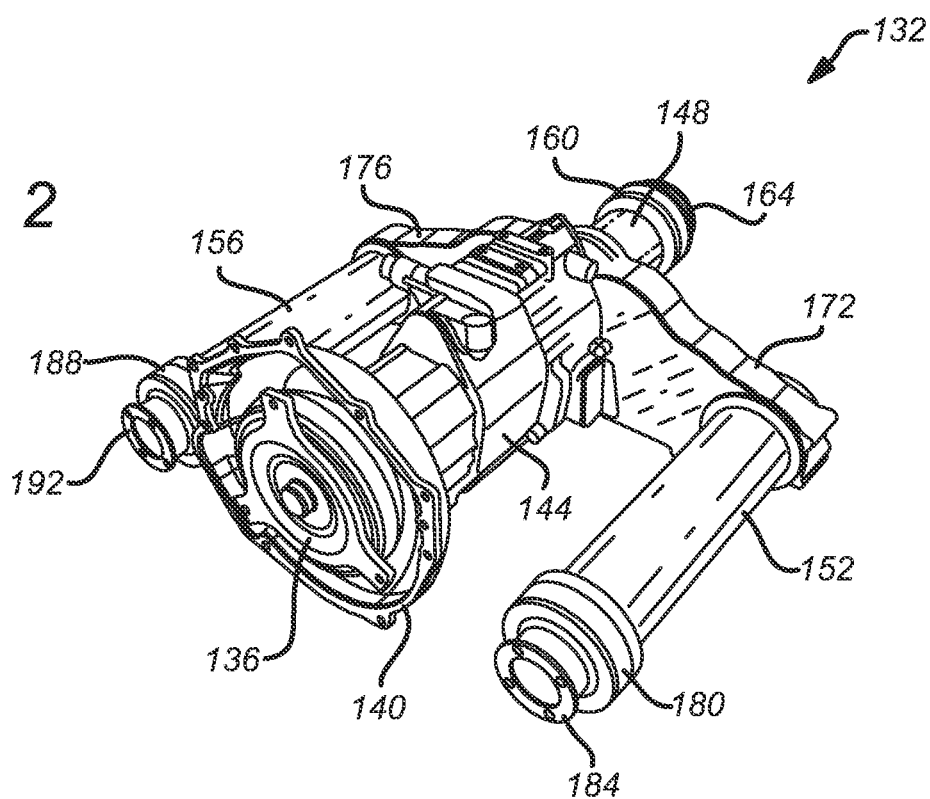
FIG. 2 illustrates a perspective view of an exemplary embodiment of tri-drive transmission suitable for a rear mid-engine vehicle according to the present disclosure.

Turning, now, to FIG. 2, a perspective view of an exemplary embodiment of tri-drive transmission 132 (hereinafter, "transmission 132") is shown according to the present disclosure. The transmission 132 is suitable for a rear mid-engine 4WD vehicle, such as the off-road vehicle 100 shown in FIG. 1. However, it is to be understood that the transmission 132 is not limited to off-road vehicles, but rather the transmission 132 may be implemented in a wide variety of different vehicles, such as, by way of non-limiting example, UTVs, Super Cars and other racing vehicles, on-road automobiles, trucks, recreational vehicles, buses, boats and ships, earthmoving equipment, farming vehicles and tractors, various cargo moving vehicles, and the like.

In general, the transmission 132 shown in FIG. 2 is adapted to receive power input, or torque, by way of a rear mounted engine of the vehicle and transmit the torque as power output to the front wheels 124 and the rear wheels 112 individually. The transmission 132 includes a power transfer portion 136, such as a clutch or a torque converter, suitable for being coupled with the engine. A bell housing 140 comprising the transmission 132 is configured to be fastened to the engine. The transmission 132 includes a gearbox 144 that is in mechanical communication with the power transfer portion 136. As will be appreciated, the gearbox 144 may include multiple gears and gear trains arranged to provide block conversions of rotational speed and torque received from the engine by way of the power transfer portion 136. In some embodiments, the gearbox 144 may include a differential, as needed, and without limitation.

Figure 3:
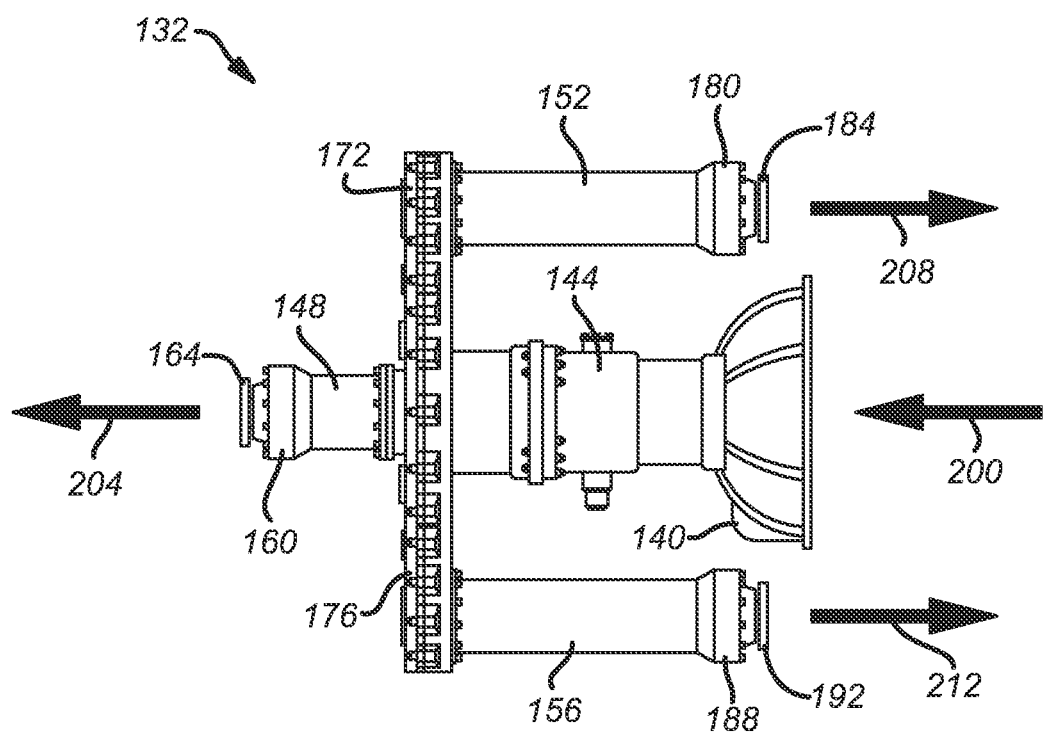
FIG. 3 is a diagram showing a power input and multiple power outputs of an exemplary embodiment of a tri-drive transmission in accordance with the present disclosure.

As shown in FIGS. 2-3, the gearbox 144 is configured to conduct torque from the engine to a forward output portion 148 as well as to flanking side output portions 152, 156. The forward output portion 148 is adapted to conduct torque to the front wheels 124 (see FIG. 1) and may include an air clutch 160 and a hub 164. The air clutch 160 is configured to facilitate controlling the degree of torque that is transferred to the front wheels 124. The air clutch 160 may be of a variety of air clutch that becomes engaged upon receiving compressed air and disengages when the air is released or vented. It is contemplated that the degree of torque transferred by air clutch 160 may be adjusted between about 0% and about 100% of the torque provided by way of the gearbox 144.

Figure 4:
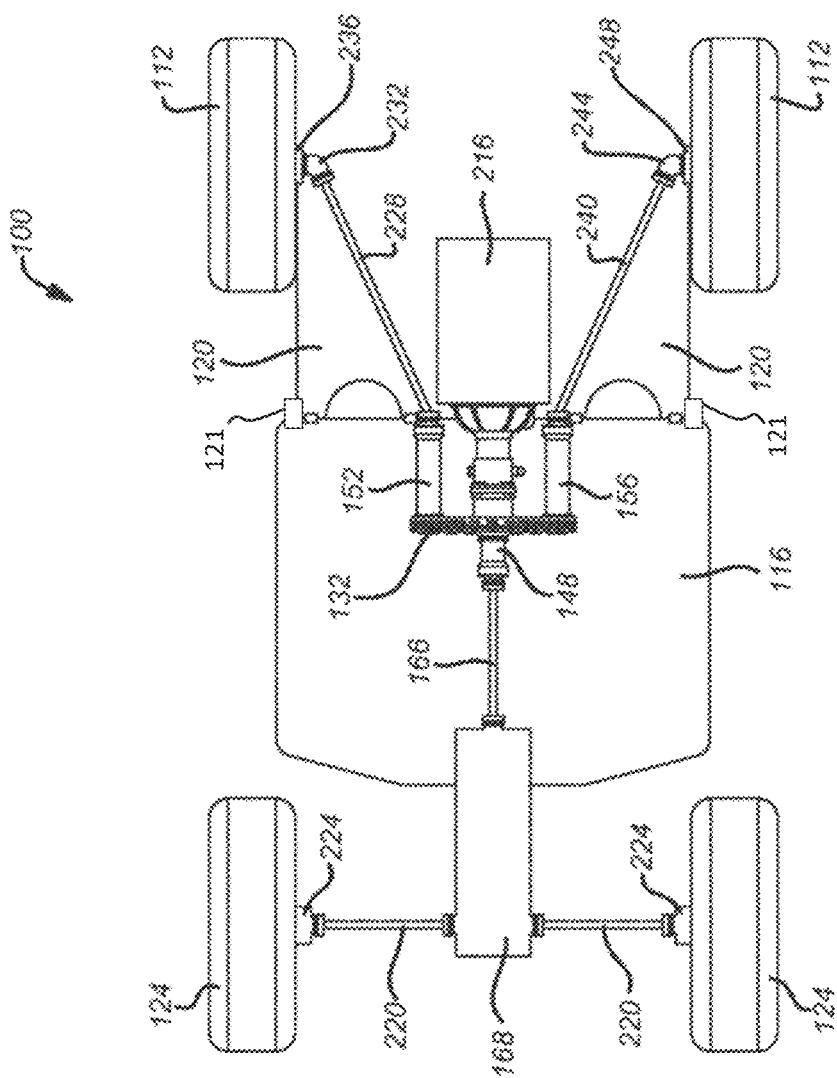
FIG. 4 is a diagram that shows a top view of a powertrain comprising an exemplary embodiment of a four-wheel drive (4WD) vehicle that includes a tri-drive transmission in accordance with the present disclosure.

The hub 164 is configured to place the forward output portion 148 into mechanical communication with the front wheels 124 by way of a drive shaft 166 and a front transaxle 168 (see FIG. 4). In some embodiments, one or more a constant velocity (CV) joint, or other suitable joints, may be used to connect the drive shaft 166 between the hub 164 and the front transaxle. In some embodiments, the front transaxle 168 may comprise a portion of a front structural bulkhead comprising the vehicle 100. Details pertaining to incorporating front transaxles into front structural bulkheads are discussed in greater detail in U.S. Provisional Patent Application, entitled "Front Structural Bulkhead For Vehicle Chassis," filed on Mar. 22, 2021, and having application Ser. No. 63/164,079, the entirety of said application being incorporated herein by reference.

In some embodiments, the forward output portion 148 may be omitted and thus the transmission 132 may comprise a "twin-drive" that includes only the side outputs 152, 156. It is contemplated that such a twin-drive will be particularly advantageous for various types of boats, such as, by way of example, UTV boats, mini jet boats, speedboats, catamarans, and the like, without limitation.

With continuing reference to FIGS. 2-3, a passenger-side gear transfer case 172 is disposed between the gearbox 144 and the side output portion 152 while a driver-side gear transfer case 176 is disposed between the gearbox 144 and the side output portion 156. The gear transfer cases 172, 176 house components configured to communicate torque to the side output portions 152, 156. In some embodiments, either or both of the gear transfer cases 172, 176 include gear trains that are configured to respectively communicate torque from the gearbox 144 to the side output portions 152, 156. In some embodiments, either or both of the gear transfer cases 172, 176 may include either a chain or a belt drive configured to conduct torque to the side output portions 152, 156. As described herein, the gear transfer cases 172, 176 generally are configured to cause the side output portions 152, 156 to rotate in directions that cause the rear wheels 112 to rotate in the same direction.

With continuing reference to FIGS. 2-3, the side output portions 152, 156 are configured to transmit torque to the rear wheels 112 (see FIG. 1) by of rear axles, as described herein. To this end, the side output portion 152 includes an air clutch 180 and a hub 184 while the side output portion 156 includes an air clutch 188 and a hub 192. It is contemplated that either or both of the air clutches 180, 188 are substantially identical to the air clutch 160. As such, the air clutch 180 facilitates controlling the degree of torque that is transferred to the rear passenger-side wheel 112 while the air clutch 188 facilitates controlling the degree of torque that is transferred to the rear driver-side wheel 112. The hubs 184, 192 are configured to place the side output portions 152, 156 into mechanical communication with the rear wheels 112, as described herein. As will be appreciated, in some embodiments, the hubs 184, 192 are configured to receive a CV joint and a drive axle whereby the rear wheels 112 may be put into rotation.

As best shown in FIG. 3, the transmission 132 generally receives a power input 200 from the engine to the gearbox 144 and distributes that power to the forward output portion 148 and the side portions 152, 156, in accordance with the present disclosure. Thus, the transmission 132 effectively directs a portion of the power input 200 as a power output 204 to the front wheels 124 by way of the forward output portion 148. Further, a power output 208 is directed to the rear passenger-side wheel 112 by way of the side output portion 152 while a power output 212 is directed to the rear driver-side wheel 112 by way of the side output portion 156.

Moreover, the air clutches 160, 180, 188 are configured to facilitate controlling the power outputs 204, 208, 212. For example, any one or more of the air clutches 160, 180, 188 may be configured as a "torque limiter" that facilitates controlling the degree of torque that is respectively output by way of the output portions 148, 152, 156. As mentioned hereinabove, the degree of torque transferred by any of the air clutches 160, 180, 188 may be adjusted between about 0% and about 100% of the torque provided by way of the gearbox 144. In some embodiments, the air clutches 160, 180, 188 may each include a solenoid and be suitably interconnected, by way of air hoses or other suitable tubing, such that air may be vented from any one or more of the air clutches 160, 180, 188 and routed into any other of the one or more of the air clutches 160, 180, 188. Thus, the air clutches 160, 180, 188 generally comprise three electronically operable valves that may be controlled by a driver of the vehicle 100 in response to various road and/or driving conditions. For example, upon detecting that a wheel is beginning to slip, the driver may vent air from the appropriate air clutch to decrease the torque applied to the wheel. Further, the vented air may be routed to the remaining air clutches to avoid a loss in total power output due to the decreased torque being applied to the slipping wheel.

In some embodiments, the air clutches 160, 180, 188 may be controlled by way of an artificial intelligence configured to operate the air clutches 160, 180, 188 in response to detected road and/or driving conditions. For example, the artificial intelligence may comprise a suitably programmed control unit that is electrically coupled with various sensors that supply the control unit with data about the operation of the vehicle 100. The control unit may operate the air clutches 160, 180, 188 based on the data received and thus intelligently control the power outputs 204, 208, 212 to accommodate road and/or driving conditions without any need for intervention by the driver.

Turning, now, to FIG. 4, the transmission 132 is shown incorporated into a powertrain of an exemplary vehicle 100, in accordance with the present disclosure. As shown in FIG. 4, the vehicle 100 includes a chassis 116 that supports the transmission 132 and an engine 216, as well as a front transaxle 168. Rear wheels 112 of the vehicle 100 are operably coupled with the chassis 116 by way of rear suspension trailing arms 120. Front wheels 124 are operably coupled with the chassis 116 by way of a front suspension system 128 (see FIG. 1). As described herein, the engine 216 supplies power input 200 (see FIG. 3) to the transmission 132, and the transmission 132 divides the power input 200 among a front output portion 148 and side output portions 152, 156. As shown in FIG. 4, the front output portion 148 is operably coupled to a front transaxle 168 by way of a driveshaft 166. Further, a front axle 220 is coupled between the front transaxle 168 and front portal gears 224 coupled with each front wheel 124. Thus, power output from the front output portion 148 is directed to the front wheels 124 by way of the front transaxle 168, the front axles 220, and the front portal gears 224. The front portal gears 224 are discussed in greater detail in U.S. Patent Application, entitled "Front Portal Spindle Assembly," filed on Aug. 21, 2020, and having application Ser. No. 17/000,075, the entirety of said application being incorporated herein by reference.

With continuing reference to FIG. 4, the side output portion 152 is operably coupled to a rear passenger-side wheel 112 by way of a rear axle 228, bevel gears 232, and rear portal gears 236. Similarly, the side output portion 156 is operably coupled to a rear driver-side wheel 112 by way of a rear axle 240, bevel gears 244, and rear portal gears 248. In general, CV joints couple the rear axle 228 between the side output portion 152 and the bevel gears 232. The bevel gears 232 overcome an acute angle between the rear axle 228 and the rear portal gears 236 and thus put the rear axle 228 into rotational communication with the rear passenger-side wheel 112. Further, CV joints couple the rear axle 240 between the side output portion 156 and the bevel gears 244. As will be appreciated, the bevel gears 244 couple the rear axle 240 with the rear portal gears 248 and thus put the rear axle 240 into rotational communication with the rear driver-side wheel 112. The rear portal gears 236, 248 may be incorporated into the trailing arms 120 or may comprise separate components that are fastened onto the trailing arms 120, without limitation. Details pertaining to the rear portal gears 236, 248 may be found in U.S. Provisional Patent Application, entitled "Rear Portal Gear Assembly For Trailing Arms," filed on May 24, 2021, and having application Ser. No. 63/192,202, the entirety of said application being incorporated herein by reference.

As shown in FIG. 4, the rear axles 228, 240 are aligned with inboard portions 121 of the trailing arms 120, unlike conventional drivetrains wherein the rear axles generally are perpendicular to the trailing arms. Further, the rear axles 228, 240 are relatively longer than conventional rear axles and are disposed above the trailing arms 120. Experimentation has demonstrated that positioning the rear axles 228, 240 above the trailing arms 120 protects the rear axles 228, 240 from potential damage due to impacts by rocks and other debris. Further, the length of the rear axles 228, 240 and their alignment with the trailing arms 120 cause the CV joints to articulate in the same direction as the trailing arms 120, resulting in less articulation angle, less plunging, and thus an increased vertical travel of the rear wheels 112. Observations have shown that the rear axles 228, 240, illustrated in FIG. 4, generally result in better handing of the vehicle 100 as compared to vehicles that include conventional rear axle arrangements.

While the tri-drive transmission and methods have been described in terms of particular variations and illustrative figures, those of ordinary skill in the art will recognize that the tri-drive transmission is not limited to the variations or figures described. In addition, where methods and steps described above indicate certain events occurring in certain order, those of ordinary skill in the art will recognize that the ordering of certain steps may be modified and that such modifications are in accordance with the variations of the tri-drive transmission. Additionally, certain of the steps may be performed concurrently in a parallel process when possible, as well as performed sequentially as described above. To the extent there are variations of the tri-drive transmission, which are within the spirit of the disclosure or equivalent to the tri-drive transmission found in the claims, it is the intent that this patent will cover those variations as well. Therefore, the present disclosure is to be understood as not limited by the specific embodiments described herein, but only by scope of the appended claims.

What is claimed is:

1. An apparatus for transmitting torque received from a rear mounted engine of a vehicle, comprising:
   a power transfer unit configured to couple the apparatus to the engine;
   a gearbox configured for conversions of rotational speed and torque;
   a first side output unit comprising a clutch and a hub, wherein the first side output unit is configured to conduct torque to a first rear wheel; and
   a second side output unit comprising a clutch and a hub, wherein the second side output unit is configured to conduct torque to a second rear wheel, wherein the first side output unit is operably coupled to the first rear wheel by way of a first rear axle, bevel gears, and rear portal gears, wherein the second side output unit is operably coupled to the second rear wheel by way of a second rear axle, bevel gears, and rear portal gears, wherein the first rear axle and the second rear axle are aligned with inboard portions of trailing arms comprising a rear suspension of the vehicle.

2. The apparatus of claim 1, wherein the apparatus further comprises a forward output unit configured to connect to a front axle through a drive shaft.

3. The apparatus of claim 2, wherein the forward output unit comprises an air clutch configured to facilitate controlling a degree of torque transferred to front wheels.

4. The apparatus of claim 1, wherein the gearbox is in mechanical communication with the power transfer portion.

5. The apparatus of claim 1, wherein a first side gear transfer case is disposed between the gearbox and the first side output unit; and wherein a second side gear transfer case is disposed between the gearbox and the second side output unit.

6. The apparatus of claim 5, wherein the first side gear transfer case and the second side gear transfer case encase components configured to respectively communicate torque to the first side output unit and the second side output unit.

7. The apparatus of claim 1, wherein the first rear axle and the second rear axle are disposed above the respective trailing arms to protect the first rear axle and the second rear axle from potential damage due to impacts by rocks and other debris.

8. The apparatus of claim 7, wherein each of the first rear axle and the second rear axle has a length and an alignment relative to the respective trailing arms such that constant velocity joints articulate in the same direction as the respective trailing arms.

9. An apparatus for transmitting torque received from a rear mounted engine of a vehicle, comprising:
 a power transfer unit configured to couple the apparatus to the engine;
 a gearbox configured for conversions of rotational speed and torque;
 a first side output unit comprising a first air clutch, wherein the first side output unit is configured to conduct torque to a first rear wheel; and
 a second side output unit comprising a second air clutch, wherein the second side output unit is configured to conduct torque to a second rear wheel,
 a forward output unit comprising a third air clutch, wherein the forward output unit is configured to conduct torque to front wheels, wherein the first air clutch and the second air clutch are interconnected with a third air clutch,
 wherein the first air clutch, the second air clutch, and the third air clutch are configured to facilitate controlling the degree of torque,
 wherein each of the first air clutch, the second air clutch, and the third air clutch includes a solenoid configured to release air upon activation.

10. The apparatus of claim 9, wherein air released from one or more of the first, second, and third air clutches is routed to any other of the one or more of the first, second, and third air clutches.

11. The apparatus of claim 10, wherein the first, second, and third air clutches are controlled using artificial intelligence configured to operate the first, second, and third air clutches in response to detected road and/or driving conditions.

12. The apparatus of claim 11, wherein the apparatus comprises sensors configured to detect data about operation of the vehicle for the artificial intelligence.

13. The apparatus of claim 12, wherein the artificial intelligence is configured to operate the first, second, and third air clutches to accommodate the road and/or driving conditions without any need for intervention by a driver of the vehicle.

14. The apparatus of claim 9, wherein the first side output unit is operably coupled to the first rear wheel by way of a first rear axle, bevel gears, and rear portal gears; and wherein the second side output unit is operably coupled to the second rear wheel by way of a second rear axle, bevel gears, and rear portal gears.

15. The apparatus of claim 14, wherein the first rear axle and the second rear axle are aligned with inboard portions of trailing arms comprising a rear suspension of the vehicle.

* * * * *